United States Patent Office 3,097,217
Patented July 9, 1963

---

3,097,217
SUBSTITUTED SULFANILAMIDE
Ferdinand B. Zienty, Warson Woods, Mo., assignor to Monsanto Chemical Company, St. Louis, Mo., a corporation of Delaware
No Drawing. Filed Oct. 21, 1960, Ser. No. 63,963
7 Claims. (Cl. 260—397.7)

This invention relates to a new class of substituted sulfanilamides having useful properties as hereinafter described. More particularly, the invention is related to condensing sulfanilamide with dibasic acid anhydrides.

Sulfanilamide has been found to readily condense with acid anhydrides of the structure.

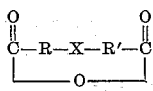

wherein X is selected from the group consisting of sulfur and oxygen and wherein R and R' are each alkylene radicals having up to four (4) carbon atoms. Compounds formed by this reaction may be represented by the structure:

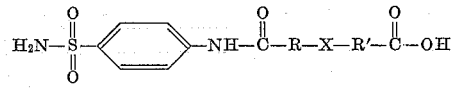

However, if the synthesis involves a final step in the presence of an alkaline hydroxide; such as the alkali metal hydroxides, for example, potassium hydroxide and sodium hydroxide; the alkaline earth metal hydroxides, for example, calcium hydroxide; and ammonium hydroxide compounds of the following structure are prepared.

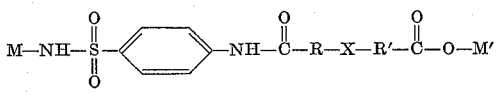

wherein M and M' are the alkali or alkaline earth metals or the ammonium radical.

The useful dicarboxylic acid anhydrides are those with oxy or thio groups in the carbon chain between the carbonyl groups, for example diglycolic acid anhydride, thioacetic anhydride, oxaadipic acid anhydride, thia adipic acid anhydride, oxapimelic acid anhydride, thiapimelic acid anhydride, oxasuberic acid anhydride, thiasuberic acid anhydride, oxaazelaic acid anhydride, thiaazelaic acid anhydride, oxasebacic acid anhydride and thiasebacic acid anhydride.

The dicarboxylic acid anhydrides and the sulfathiazoles are mixed in an organic liquid medium, such as acetone, dioxane, benzene, toluene, xylene, and hexane. It is usually necessary to effect this condensation at an elevated temperature, for example, the temperature of the reflux of the low boiling liquid medium. After the reaction is completed the organic medium may be evaporated and the solid residue purified by recrystallizing from water.

Further details are set forth in the following examples:

Example I

A 500 ml. reaction flask was charged with 28.5 g. of sulfanilamide and 19.3 g. of thiodiacetic anhydride and 150 ml. of anhydrous dioxane. Upon refluxing for two hours the dioxane was evaporated and the residue treated with a quantity of water required for its dissolution. Upon cooling, a crystalline product was formed, which upon recrystallization from water was found to have a melting point of 180 to 182° C. It was identified as a compound having the structure:

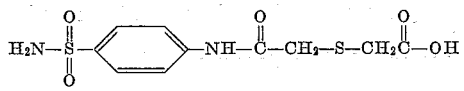

Example II

The procedure of Example I except with the substitution of diglycolic acid anhydride in place of the thiodiacetic acid anhydride produces a compound identified as a compound of the structure:

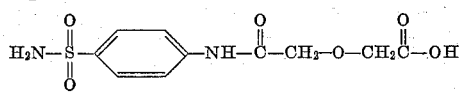

Example III

By using thia adipic acid anhydride in place of the thiodiacetic anhydride of Example I a compound of the structure

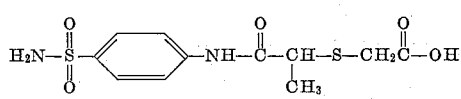

is prepared.

Example IV

When using the procedure of Example I except by substituting oxa adipic acid anhydride in place of the thiodiacetic anhydride a compound of the following structure is prepared:

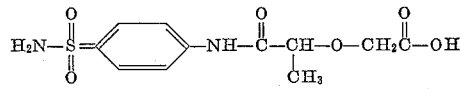

Example V

When the procedure of Example I is used except by the substitution of oxapimelic acid anhydride in place of the thiodiacetic anhydride there is prepared a compound of the structure:

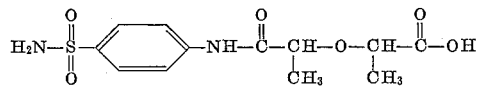

Example VI

A flask was charged with 250 ml. of an aqueous solution containing 4 g. of sodium hydroxide. To this there was added 30.4 g. of the compound prepared in Example I, producing the monosodium salt. The salt can be used in solution or the water may be evaporated to recover the dry salt.

Example VII

A flask was charged with 150 ml. of an aqueous solution containing 8 g. of sodium hydroxide. To this there was added 30.4 g. of the compound prepared in Example I, producing the disodium salt. The salt can be used in solution or the water may be evaporated to recover the dry salt.

Example VIII

A flask was charged with 250 ml. of an aqueous solution containing 4 g. of sodium hydroxide. To this there was added 28.8 g. of the compound prepared in Example II, producing the monosodium salt. The salt can be used in solution or the water may be evaporated to recover the dry salt.

Example IX

A flask was charged with 150 ml. of an aqueous solution containing 8 g. of sodium hydroxide. To this there was added 28.8 g. of the compound prepared in Example II, producing the disodium salt. The salt can be used in solution or the water may be evaporated to recover the dry salt.

The above described compounds are antioxidants for synthetic rubbers and particularly Neoprene.

The embodiments of the invention in which an exclusive property or privilege is claimed are defined as follows:

1. A compound of the structure

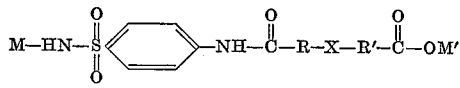

wherein X is selected from the group consisting of sulfur and oxygen; wherein R and R' are each alkylene radicals having up to four (4) carbon atoms; and wherein M and M' are selected from the group consisting of hydrogen, alkali metals, alkaline earth metals and the ammonium radical.

2. A compound of the structure:

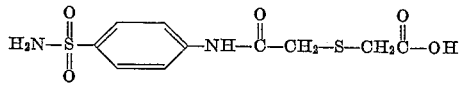

3. A compound of the structure:

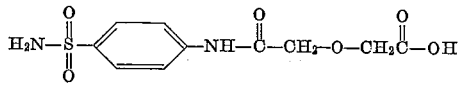

4. A compound of the structure:

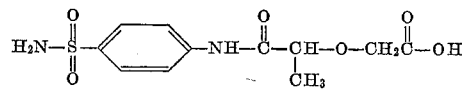

5. A compound of the structure:

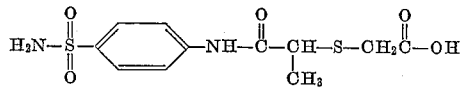

6. A compound of the structure:

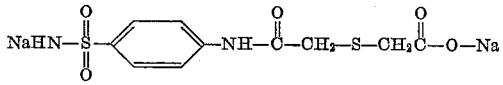

7. A compound of the structure:

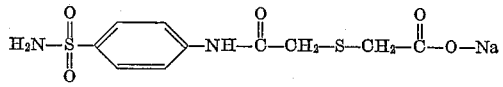

References Cited in the file of this patent
UNITED STATES PATENTS

| | | |
|---|---|---|
| 2,383,859 | Hentrich et al. | Aug. 28, 1945 |
| 2,404,737 | Moore | Jan. 23, 1946 |
| 2,418,947 | Lott et al. | Apr. 15, 1947 |
| 2,520,293 | Weiss | Aug. 29, 1950 |
| 2,602,085 | Ruskin | July 1, 1952 |

FOREIGN PATENTS

| | | |
|---|---|---|
| 595,038 | Great Britain | Nov. 25, 1947 |
| 665,339 | Great Britain | Jan. 23, 1952 |